(12) United States Patent
Kuku et al.

(10) Patent No.: US 9,868,086 B2
(45) Date of Patent: Jan. 16, 2018

(54) EXHAUST GAS CLEAN-UP SYSTEM FOR FOSSIL FUEL FIRED POWER PLANT

(71) Applicants: Lai O. Kuku, Gilbert, AZ (US); Andre M. Fuentes, Maricopa, AZ (US)

(72) Inventors: Lai O. Kuku, Gilbert, AZ (US); Andre M. Fuentes, Maricopa, AZ (US)

(73) Assignee: MILLENIUM SYNTHFUELS CORPORATION, Gilbert, AZ (US)

( * ) Notice: Subject to any disclaimer, the term of this patent is extended or adjusted under 35 U.S.C. 154(b) by 0 days.

(21) Appl. No.: 15/227,860

(22) Filed: Aug. 3, 2016

(65) Prior Publication Data
US 2016/0361685 A1 Dec. 15, 2016

Related U.S. Application Data

(63) Continuation-in-part of application No. 14/324,200, filed on Jul. 6, 2014, now abandoned.

(51) Int. Cl.
| | |
|---|---|
| *B01D 53/14* | (2006.01) |
| *B01D 53/75* | (2006.01) |
| *B01D 53/50* | (2006.01) |
| *B01D 53/86* | (2006.01) |
| *B01D 53/62* | (2006.01) |
| *B01D 53/40* | (2006.01) |
| *F01K 27/00* | (2006.01) |

(52) U.S. Cl.
CPC ............ *B01D 53/75* (2013.01); *B01D 53/40* (2013.01); *B01D 53/504* (2013.01); *B01D 53/62* (2013.01); *B01D 53/864* (2013.01); *B01D 53/869* (2013.01); *B01D 53/8628* (2013.01); *B01D 53/8631* (2013.01); *B01D 53/8681* (2013.01); *B01D 2251/404* (2013.01); *B01D 2251/604* (2013.01); *B01D 2251/606* (2013.01); *B01D 2255/1021* (2013.01); *B01D 2258/0283* (2013.01); *F01K 27/00* (2013.01)

(58) Field of Classification Search
USPC .......... 423/243.01; 60/60, 295; 422/168–172
See application file for complete search history.

(56) References Cited

U.S. PATENT DOCUMENTS

| | | | | |
|---|---|---|---|---|
| 4,625,661 | A * | 12/1986 | Melchior | F23G 5/0273 110/215 |
| 5,458,862 | A * | 10/1995 | Glawion | B01D 53/72 110/214 |
| 5,630,991 | A * | 5/1997 | Gal | B01D 53/501 423/243.01 |
| 5,658,541 | A * | 8/1997 | Matros | B01D 53/8603 423/210 |
| 2012/0031081 | A1* | 2/2012 | Mullinix | F01N 1/18 60/295 |
| 2015/0260064 | A1* | 9/2015 | Majkowski | B01D 46/247 95/273 |

* cited by examiner

*Primary Examiner* — Nina Bhat

(57) ABSTRACT

A fossil fuel fired power plant exhaust gas clean-up system is provided to remove detrimental compounds/elements from the exhaust gas emitting from the power plant to protect the environment. This is accomplished primarily by directing the exhaust gas from a fossil fuel fired power plant through both a reaction chamber containing a chemically produced compound and a catalytic converter. The final exhaust gas can now be safely exhausted to the atmosphere and only contains nitrogen gas, oxygen, water and a trace amount of carbon dioxide.

17 Claims, 3 Drawing Sheets

EXHAUST GAS CLEAN-UP SYSTEM FOR FOSSIL FUEL FIRED POWER PLANT

TECHNICAL FIELD

The subject design relates generally to an exhaust gas clean-up system that helps to remove some detrimental exhaust gas compositions and more specifically relates to a process and apparatus that processes exhaust gas from a fossil fuel fired power plant to remove detrimental exhaust gas compositions.

BACKGROUND

There have been many different arrangements that attempt to remove detrimental flu gas compositions but most of them are only partially effective in removing most if not all of the detrimental exhaust gas compositions. This many times is based on the extreme cost of effective types of exhaust gas removal systems. Emissions of nitrogen oxides into the atmosphere can result in the generation of ozone in our atmosphere. Ozone is important in our higher altitudes since it helps to offset the effects of the sun's damaging rays on the earth. However, ozone can be a hazard to humans when it is within our habitable altitude. Another emitted gas that is detrimental is sulfur dioxide. It reacts with atmospheric water and causes acid rain. Likewise, carbon dioxide creates major environmental issues when exhausted into the atmosphere and is the main cause of global warming and climate change U.S. Pat. No. 4,625,661 which issued on Dec. 2, 1986 to August S. Melchior teaches the use of boiling chambers followed by individual catalytic converters to vaporize small amount of hazardous waste materials. There is not teaching or suggestion of using a reaction chamber having an added reacting compound therein to remove various detrimental compounds. U.S. Pat. No. 5,630,991 which issued on May 20, 1997 to Eli Gal et al teaches a process for dissolving limestone by adding ammonium ions to the process. Eli Gal et al is using ammonium ions to aid in breaking down the limestone to a more finite size and does not teach the use of adding a reacting compound to a reaction chamber to cause a chemical reaction to reduce detrimental elements in the exhaust gas. The adding of calcium hydroxide to the slurry og Eli Gal et al is done merely to raise the pH level therein. Other publications, such as: U.S. Pat. Nos. 5,362,468; 7,065,962; 5,034,204; and US Publication 2008/0233025 each teach systems for addressing removal of certain gases from an exhaust gas. None of the above noted publication teach singularly or in combination the subject matter claimed herein. The subject design serves as a possible solution to at least the above noted detrimental exhaust gases.

SUMMARY OF THE INVENTION

According to the present design, an exhaust gas clean-up system is provided that is effective to remove various detrimental gases from a fossil fuel fired power plant prior to the exhaust gas entering the atmosphere. In general these operational steps comprise directing the exhaust gas from the fossil fuel fired power plant to a reaction chamber to modify the exhaust gas. To aid in modifying the exhaust gas from the fossil fuel fired power plant, a reacting compound is added to the reactor chamber. A chemically produced compound, along with water, is produced in the reaction chamber and directed away for further use while the modified exhaust gas is passed downstream therefrom. A catalytic convertor is disposed in the path of the exhaust gas in one of the upstream side and the downstream side of the reaction chamber. The final chemically modified exhaust gas is now ready to be released to the atmosphere.

The sequence of the various steps and the interaction therebetween permits the production of various byproducts, and which in some instances permit the use of the byproducts in the chemical reaction of compounds in other parts of the process.

Other objects, features, and advantages of the subject design will become more apparent from the following detailed description of the following embodiment and certain modification thereof when taken together with the accompanying drawing.

DETAILED DESCRIPTION

Figure 1:
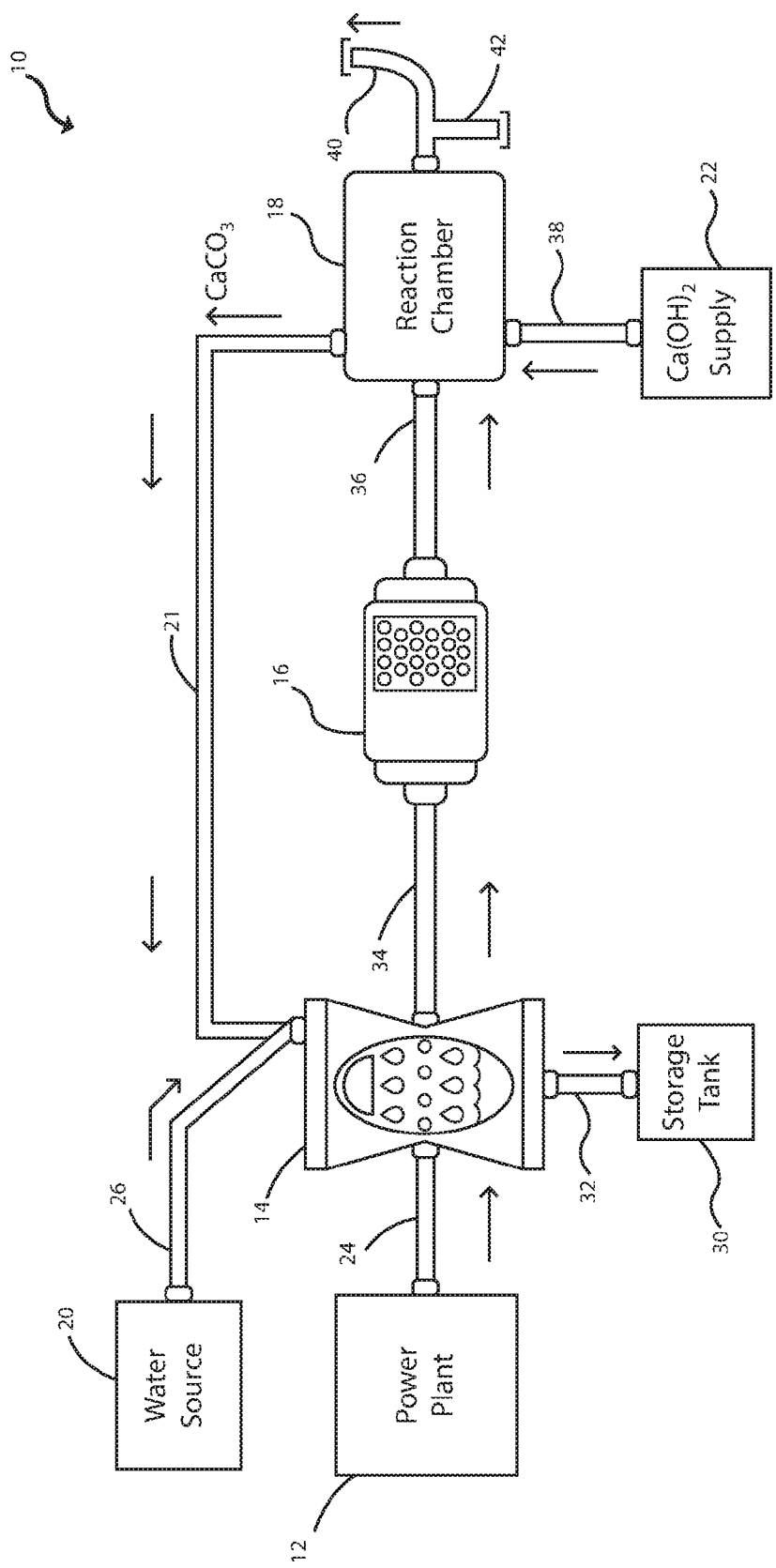
FIG. 1 is a partial flow chart and a partial diagrammatic representation of one embodiment of the subject design.

Referring to FIG. 1 of the drawings, an exhaust gas clean-up system 10 is provided. The exhaust gas clean-up system 10 is connected to the exhaust of a typical fossil fuel fired power plant 12. The exhaust gas from the fossil fuel fired power plant 12 contains various percentages of water ($H_2O$), nitrogen (N), sulfur dioxide ($SO_2$), carbon dioxide ($CO_2$), and nitrogen oxides ($NO_x$). There could be minimal amounts of carbon monoxide (CO) depending on the purity of the fossil fuel being used. The gas clean-up system 10 includes a wet scrubber 14, a catalytic converter 16, a reaction chamber 18, a source of water 20, a source of a chemically produced compound connecting line 21, and a source of reacting compound 22.

The wet scrubber is connected to the exhaust of the power plant 12 by an exhaust gas connection line 24 and to the source of water 20 by a water connection line 26. The source 22 of the chemically produced compound is, in the subject arrangement, the reacting chamber 18 and is connected to the wet scrubber by a compound connection line 21. The chemical reaction within the wet scrubber 14 produces a usable by-product and acts to remove the sulfur by the chemical reaction between the sulfur dioxide in the exhaust gas, the slurry of water and calcium carbonate as seen below:

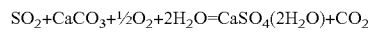

$$SO_2 + CaCO_3 + \tfrac{1}{2}O_2 + 2H_2O = CaSO_4(2H_2O) + CO_2$$

This reaction consumes calcium carbonate, water, and oxygen in order to convert sulfur dioxide into $CaSO_4(2H_2O)$ which can be utilized in various ways as gypsum. The by-product of gypsum is directed to a holding tank 30 by a bypass line 32. This reaction cleans up the sulfur dioxide that is contained in the exhaust gas.

The chemically modified exhaust gas is now directed to the catalytic converter 16 by the converter connecting line 34 further chemically modifying the exhaust gas. The catalytic converter 16 can be a typical catalytic converter used in most automobiles. However, a platinum converter with an internal honeycomb arrangement is more effective even though the use of the platinum converter does not depart from the essence of the subject invention. Even though the catalytic converter 16 is shown upstream of the reaction chamber 18, it is recognized that it could be located downstream of the reaction chamber 18 without departing from the essence of the subject arrangement. The catalytic converter would still function as described hereinafter.

Within the subject catalytic converter 16, the nitrogen oxides are converted into nitrogen (N) and oxygen ($O_2$). The residual carbon monoxide (CO) may converted into carbon dioxide ($CO_2$) and water ($H_2O$). The major difference between the use of fossil fuel, as used herein, and gas fuel as used in automobiles is that the burning of fossil fuel does not produce hydrocarbons like the burning of gasoline in automobiles. The burning of gasoline is responsible for the production of large amounts of carbon monoxide (CO) which usually are not present in fossil fuels. Even though catalytic converters are used in automobiles to reduce and/or remove carbon monoxide and hydrocarbons, these gas are not present in the subject exhaust gas. If they happen to be present, they will only be in minimal amounts. At this point within the design, the nitrogen oxides ($NO_x$) and the sulfur oxides ($SO_2$) have been addressed and that which is left is nitrogen gas (N), water ($H_2O$), carbon dioxide ($CO_2$), and oxygen ($O_2$).

In order to eliminate carbon dioxide ($CO_2$) emissions as well as provide the wet scrubber 14 with the chemically produced compound, i.e. calcium carbonate ($CaCO_3$) and water, the further chemically modified exhaust gas is passed to the reaction chamber 18 through a reacting connection line 36. The source of reacting compound, i.e. calcium hydroxide ($Ca(OH)_2$, is introduced in the reaction chamber 18 through a reacting compound line 38.

The chemical reaction within the reaction chamber is as follows:

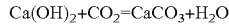

$$Ca(OH)_2 + CO_2 = CaCO_3 + H_2O$$

The calcium carbonate ($CaCO_3$) and water are directed from the reaction chamber 18 to the wet scrubber 14 as the source of chemically produced compound and to add water thereto also. The source of chemically produced compound and water from the reaction chamber 18 are returned through the source of compound connecting line 21. The volume of calcium carbonate and water being bypassed from the reaction chamber 18 to the wet scrubber 14 through the source of compound connecting line 21 will normally be sufficient to continue the operating process without the need of the water source 20.

At this point in the process, the final chemically modified exhaust gas can be safely emitted into the atmosphere through an exhaust line 40. Any water that is passing through the exhaust line 40 can be bypassed to a water tank 42.

Figure 2:
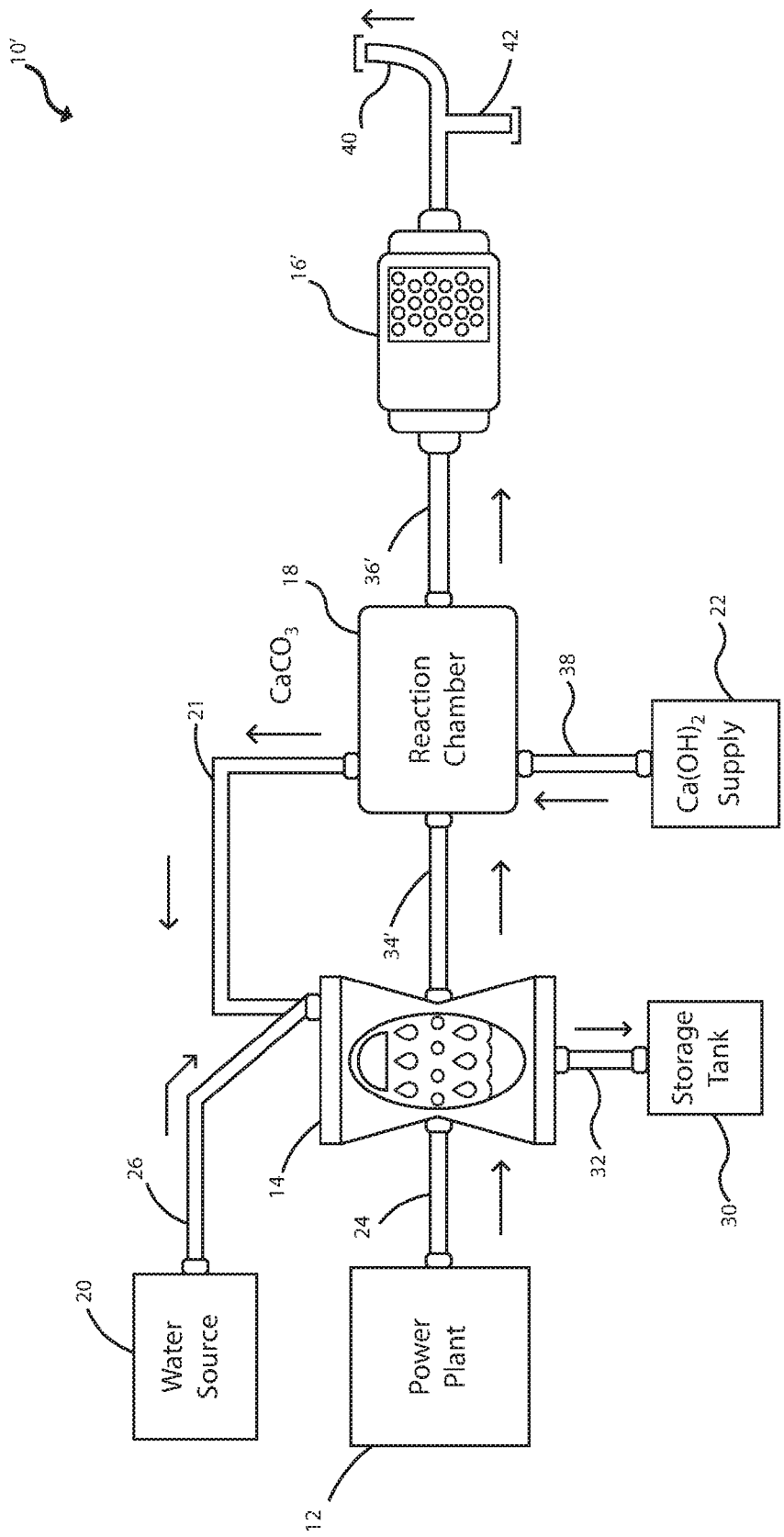
FIG. 2 is a partial flow chart and a partial diagrammatic representation of another embodiment of the subject design.

Referring to the embodiment of FIG. 2, like elements have like element numbers and moved/modified elements have like element numbers with a 'prime' symbol attached thereto.

In the embodiment of FIG. 2, the catalytic converter 16 of FIG. 1 has been moved from a location upstream of the reaction chamber 18 to a location downstream thereof between the downstream side of the reaction chamber 18 and the atmosphere. All aspects from the embodiment of FIG. 2 function in the same manner as that of FIG. 1. Since the reaction chamber 18 serves to eliminate carbon dioxide present and the catalytic converter eliminates nitrogen oxides, the exhaust gas is now safe to vent it to the atmosphere.

Figure 3:
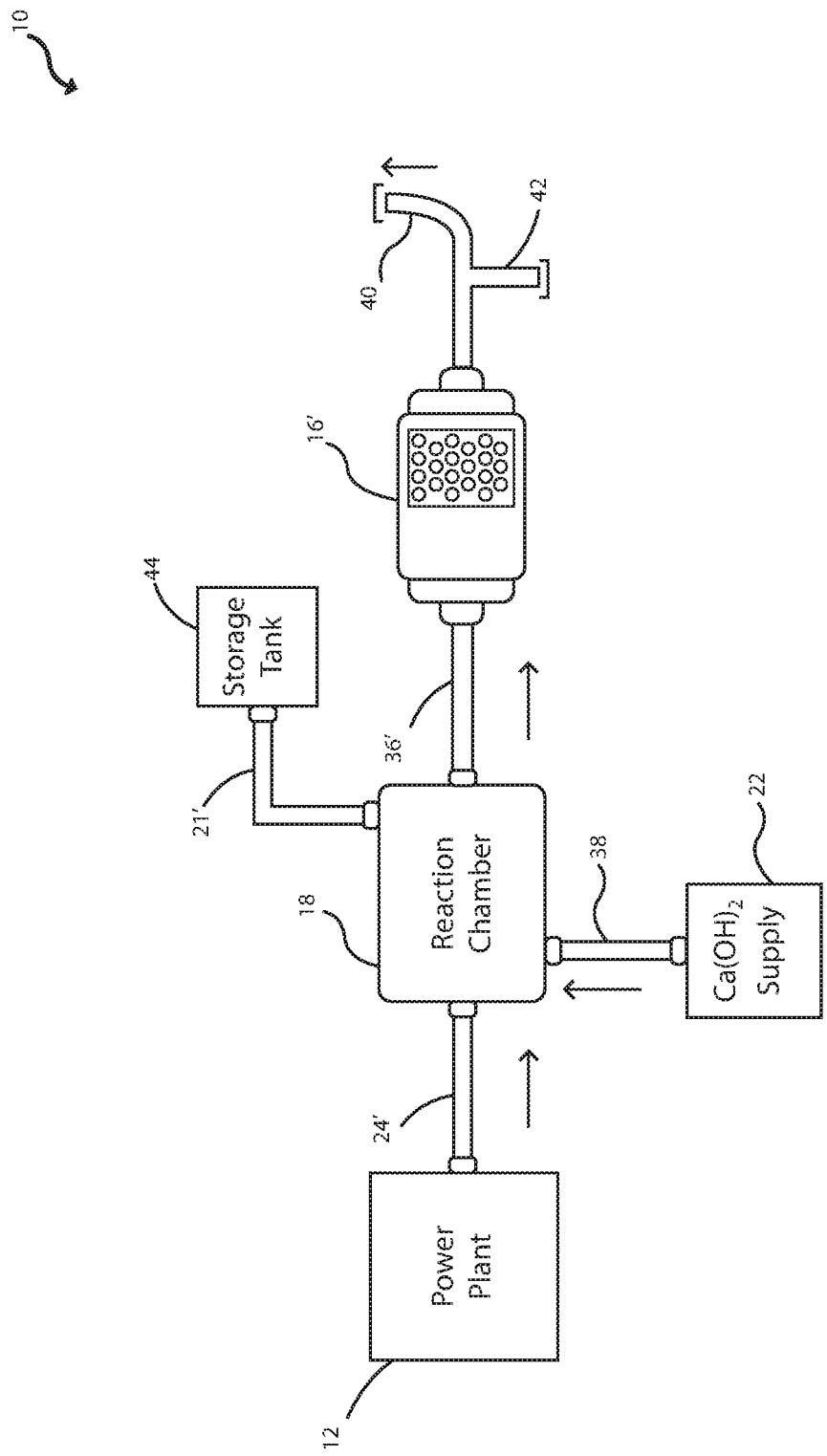
FIG. 3 is a partial flow chart and a partial diagrammatic representation of yet another embodiment of the subject design.

Referring to the embodiment of FIG. 3 as compared to FIG. 1, like elements have like element numbers and moved/modified elements have like element numbers with a 'prime' symbol attached thereto.

In the embodiment of FIG. 3, the wet scrubber 14 has been deleted and the catalytic converter 16 has been moved to a location downstream of the reaction chamber 18. The calcium carbonate ($CaCO_3$) and water being bypassed from the reaction chamber 18 in FIGS. 1 and 2 are being directed through the chemically produced compound line 21' to a storage tank 44. This calcium carbonate and water can be further processed as needed to extract calcium carbonate or to produce a gypsum product. The chemical reaction that was taking place in the wet scrubber 14 of FIGS. 1 and 2 is also taking place in the reaction chamber 18. Consequently, in most applications, the wet scrubber 14 is not needed. As previously noted with respect to FIG. 2, the catalytic converter 16' functions in the same manner as that described in FIG. 1 and FIG. 2.

As with respect to FIG. 1, the embodiments of FIGS. 2 and 3, the cleaned exhaust gas may be safely emitted into the atmosphere without concern.

INDUSTRIAL APPLICABILITY

The subject processes set forth herein for exhaust gas clean-up provides a simple, safe, cost effective and an excellent process for removing detrimental compounds/elements from the exhaust of a fossil fuel fired power plant 12.

By directing the exhaust gas from the fossil fuel fired power plant 12 through any of the three embodiments presented herein, the detrimental compounds previously submitted are removed. With respect to FIG. 1, a wet scrubber 14 having a solution of water, calcium carbonate ($CaCO_3$), oxygen ($O_2$), and sulfur dioxide ($SO_2$) therein, the sulfur is chemically removed and the by-product of the gypsum slurry ($CaSO_4(2H_2O)$) is directed to a storage tank 30. During the reaction within the wet scrubber 14, the calcium carbonate ($CaCO_3$), water ($H_2O$), and oxygen ($O_2$) is consumed to convert the sulfur dioxide ($SO_2$) to the gypsum slurry ($CaSO_4(2H_2O)$). Even though the wet scrubber 14, is connected to the remote source of waster 20, the water being produced in the reaction chamber 18 and directed to the wet scrubber 14 through the source compound connection line 21 during the production of the calcium carbonate ($CACO_3$) is normally sufficient.

The chemically modified exhaust gas is passed through the catalytic converter 16 to provide chemical reaction like that of catalytic converters in automobiles. With the exception, the exhaust gases in fossil fuel fired power plants do not contain any appreciable amounts of carbon monoxide and is free of hydrocarbons. As previously stated, within the catalytic converter 16, the nitrogen oxides ($NO_2$) converts into nitrogen gas (N) and oxygen ($O_2$). The only things left at this point to treat is carbon dioxide ($CO_2$), nitrogen gas (N), water and oxygen. In order to reduce the carbon dioxide ($CO_2$) emissions as well as provide calcium carbonate ($CaCO_3$) for the wet scrubber, the exhaust gas is passed through the reaction chamber 18 that has calcium hydroxide ($Ca(OH)_2$ added therein. In the subject embodiment, the volume of calcium hydroxide ($Ca(OH)_2$ needed is approximately 962 g per 2380 L of incoming exhaust gas from the power plant 12. Within the reaction chamber 18, the chemical reaction of the calcium hydroxide ($Ca(OH)_2$ and carbon dioxide ($CO_2$), as set forth above, generates the calcium carbonate ($CaCO_3$) and water as needed in the wet scrubber 14. During this chemical reaction, the carbon dioxide ($CO_2$) level is eliminated or at least reduced to trace amounts. During the chemical reaction within the reaction chamber 18, for every 285.88 L of carbon dioxide ($CO_2$), it requires 953 g of calcium hydroxide ($Ca(OH)_2$). When the exhaust gas from the power plant 12 is low in sulfur, excess calcium carbonate ($CaCO_3$) is being generated in the reaction chamber 18. Consequently, if the exhaust gas from the power plant 12 is higher in sulfur, the extra sulfur can be readily removed due to the extra calcium carbonate ($CaCO_3$) being produced. This would not require extra calcium hydroxide ($Ca(OH)_2$) since the amount of carbon dioxide has not been changed. Furthermore an additional volume of the by-product gypsum will be produced.

As previously noted with respect to FIGS. 2 and 3, the location of the catalytic converter 16 in the exhaust gas stream is not critical. The function of the catalytic converter 16 remains the same as it was in FIG. 1. The removal of the wet scrubber 14 does not inhibit the removal thereof in most applications since the same function is being performed in the reaction chamber 18. However, it is recognized that the wet scrubber 14 could be utilized as needed.

In conclusion, this process addresses the issues of nitrogen oxide ($NO_x$), sulfur oxide ($SO_2$). The process also addresses, in the reaction chamber 18, any carbon dioxide ($CO_2$) present or produced within the process. Nitrogen oxides ($NO_x$) are removed through the catalytic converter 16 and the removal is further enhanced by using platinum as a catalyst and generating nitrogen gas (N). The carbon dioxide ($CO_2$) is removed by reacting it with the calcium hydroxide ($Ca(OH)_2$) to produce the calcium carbonate ($CaCO_3$) that is used in the wet scrubber 14, if provided, or stored in the storage tank 44.

Other embodiments as well as certain variations and modifications of the embodiment herein shown and described will obviously occur to those skilled in the art upon becoming familiar with the underlying concept. It is to be understood, therefore, that the subject design, as claimed, may be practiced otherwise than as specifically set forth above.

What is claimed is:

1. A process for exhaust gas clean-up of a fossil fuel fired power plant, comprising the steps of:
   directing the exhaust gas from the fossil fuel fired power plant through a wet scrubber;
   adding a chemically produced compound from a different source to the wet scrubber;
   mixing water from a remote source in the wet scrubber with the exhaust gas and the chemically produced compound;
   bypassing a chemically produced byproduct from the wet scrubber to storage;
   directing the chemically modified exhaust gas from the wet scrubber to a reaction chamber to chemically modify the exhaust gas;
   adding a reacting compound to the reaction chamber for modification of the exhaust gas therein and chemically produced compound;
   bypassing the chemically produced compound from the reaction chamber to the wet scrubber as the different source for the chemically produced compound;
   adding a catalytic converter in the flow path of the exhaust gas downstream of one of the wet scrubber and the reaction chamber; and
   exhausting the final chemically safe exhaust gas to the atmosphere.

2. The process as set forth in claim 1 wherein the exhaust gas from the fossil fuel fired power plant comprises water, nitrogen, sulfur dioxide, carbon dioxide, and nitrogen oxides.

3. The process as set forth in claim 2 wherein the chemically produced compound from a different source is calcium carbonate.

4. The process as set forth in claim 3 wherein the chemically produced by-product is a gypsum slurry.

5. The process as set forth in claim 4 wherein the treated exhaust gas being directed through the catalytic converter downstream of the wet scrubber contains nitrogen oxides which is converted into nitrogen and oxygen.

6. The process as set forth in claim 5 wherein the catalytic converter has a platinum honeycomb arrangement.

7. The process as set forth in claim 1 wherein the added reacting compound in the reaction chamber is calcium hydroxide.

8. The process as set forth in claim 7 wherein the calcium hydroxide chemically reacts with the exhaust gas in the reaction chamber removing the carbon dioxide and producing a mixture of calcium carbonate and water.

9. The process as set forth in claim 8 wherein the calcium carbonate chemically produced in the reaction chamber is the remote source of calcium carbonate directed to the wet scrubber to mix with the water and the exhaust gas therein.

10. The process as set forth in claim 1 wherein the fossil fuel is one of oil, natural gas, and coal.

11. The process as set forth in claim 10 wherein the fossil fuel is coal.

12. The process as set forth in claim 4 wherein the catalytic converter is disposed in the exhaust flow path downstream of the reaction chamber.

13. The process as set forth in claim 12 wherein the treated exhaust gas being direct through the catalytic converter downstream of the reaction chamber contains nitrogen oxides which are converted into atmosphere safe nitrogen and oxygen.

14. An exhaust gas clean-up system adapted for use with a fossil fuel fired power plant, consisting of:
   a reaction chamber connected to the fossil fuel fired power plant and operative to receive and direct the exhaust gas therethrough, to receive a reacting compound from a remote source to chemically react with the exhaust gas therein, and to bypass a chemically produced compound to one of a storage tank and a wet scrubber; and
   a catalytic converter connected to the reaction chamber downstream thereof, wherein the treated exhaust gas being directed through the catalytic converter contains nitrogen oxides which are converted into atmosphere safe nitrogen and oxygen.

15. The exhaust gas clean-up system of claim 14 wherein the reacting compound is calcium hydroxide.

16. The exhaust gas clean-up system of claim 15 wherein the chemically produced compound is a slurry of calcium carbonate and water that is directed to a storage tank.

17. The exhaust gas clean-up system of claim 16 wherein the catalytic converter has a platinum honeycomb arrangement.

* * * * *